Feb. 18, 1936.　　　C. A. MARIEN　　　2,030,927
PISTON PACKING RING
Filed Dec. 29, 1934
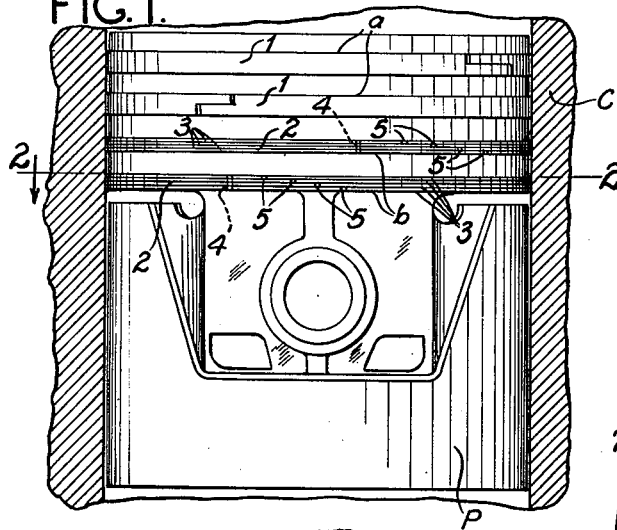
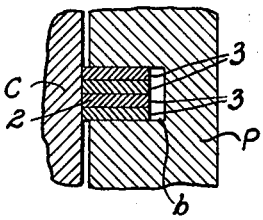
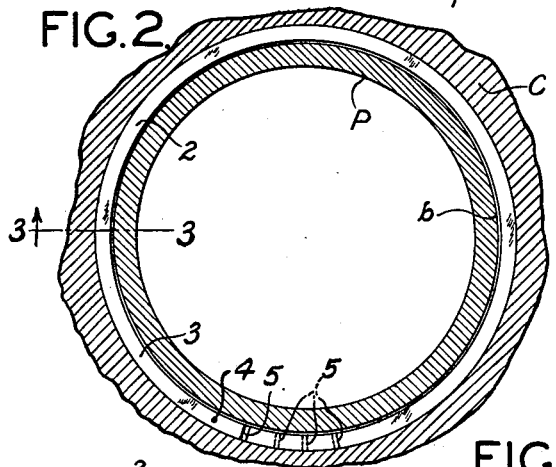
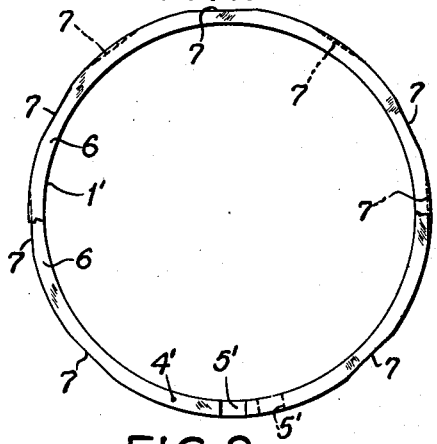
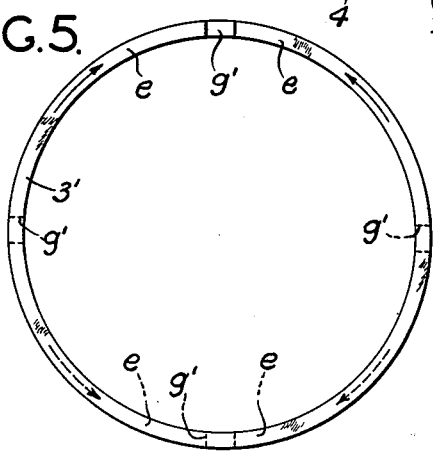
INVENTOR;
CHARLES A. MARIEN
BY Harry A. Beimes
ATTORNEY Patented Feb. 18, 1936

2,030,927

UNITED STATES PATENT OFFICE 2,030,927

PISTON PACKING RING

Charles A. Marien, St. Louis, Mo., assignor to Ramsey Accessories Manufacturing Corporation, St. Louis, Mo., a corporation of Missouri Application December 29, 1934, Serial No. 759,630

2 Claims. (Cl. 309—29)

My invention has relation to improvements in piston packing rings, and it consists in the novel features of construction more fully set forth in the specification and pointed out in the claims.

The invention is primarily directed to a piston ring that effectively combines both the properties of a compression ring and an oil ring and has for its principal object the provision of a multiple section ring having responsiveness in action comparable to a one-piece ring. The ring is made up of sections or, more strictly speaking, laminations of cast iron, bronze or spring steel, each lamination in itself being a thin split ring and all of the laminations being secured together in such manner that the ring as a whole will freely expand and contract in operation. In order that the advantages of the invention may be better understood, it may not be amiss to refer briefly to some types of laminated rings that have heretofore been tried and found to possess defects which it is my object to eliminate.

The piling of a plurality of thin ring sections or laminations in a single piston ring groove is old in general. Rings made of soft steel laminations have been tried, but have not proven satisfactory, owing to the high friction existing between the thin soft steel laminations and the cast iron cylinder wall. The abrasive action is great and particles worn from the laminations produced serious scoring of the cylinders. Efforts have also been made to produce a ring of this type in which the laminations are of tempered steel, and in these rings the abrasion is not so great, but the friction between the contacting surfaces of the respective laminations together with the high unit wall pressure of each lamination counteract the flexibility of the individual laminations and prevents the ring from freely expanding and contracting as it operates over the cylinder wall. Furthermore, the abrasive action between contacting surfaces produces excessive wear on said surfaces and the laminations are soon worn so thin that the ring as a whole has excessive clearance in the piston ring groove.

It was sought to overcome some of the defects above mentioned by manufacturing the laminations of special alloys, particularly certain compositions of bronze, but the results have not been satisfactory. After a short period of use, about 1500 miles of running of the automobile, the bronze sections collapse and buckle so as to become worthless. In some instances the rings freeze in the grooves and in other instances they wear to such an extent as to become loose. In both cases the bronze rings soon cease to function.

In my improved laminated ring the above defects are largely overcome in a manner that will be better apparent from a detailed description of the invention in connection with the accompanying drawing, in which:

Figure 1 is a side elevation of a piston disposed within a cylinder shown in section, said piston having its bottom ring groove equipped with my laminated ring; Fig. 2 is a horizontal cross-section taken on the line 2—2 of Fig. 1; Fig. 3 is an enlarged cross-sectional detail taken on a plane indicated by the line 3—3 of Fig. 2; Fig. 4 is an enlarged side elevation of my improved laminated ring with a part broken away; Fig. 5 is a plan view of a conventional laminated ring showing the usual arrangement of the gaps of the respective laminations; Fig. 6 is a side elevation of the laminations arranged as shown in Fig. 5; and Figs. 7 and 8 are plan and side elevations, respectively, of a modified form of laminated ring embodying the principles of the present invention.

Referring to the drawing, P represents an engine piston operable in the cylinder C and provided with the usual piston ring grooves $a$, $a$ and $b$, $b$. The upper two grooves $a$ have the usual compression rings 1, 1 disposed in them, and the lower grooves $b$, $b$ contain my improved ring 2 which has a plurality of sections or laminations 3, 3, 3, 3, secured in intimate contact by a single pin 4, disposed close to the ring gap. The ring gap is formed by the gaps 5, 5, 5, 5 of the respective laminations, which gaps are arranged in cascading relation; that is, the gap 5 of the upper lamination is close to the pin 4 and the gap of each succeeding lamination overlaps so that the joint formed by the plurality of gaps is step-like (Fig. 4).

It is customary with piston manufacturers to make the piston ring grooves of a size to accommodate rings the width of which are multiples of $\frac{3}{32}''$; that is, standard ring sizes are $\frac{3}{32}''$, $\frac{1}{8}''$, $\frac{3}{32}''$, etc. For this reason, the laminations 3 of my improved ring are $\frac{3}{32}''$ in thickness so that for a $\frac{3}{32}''$ ring three are required, for a $\frac{1}{8}''$ ring four are required, etc. In operation the laminations of any given width ring completely fill the ring groove $b$ because there is a somewhat lateral expansive action of the laminations as the ring is radially contracted and expanded in its travel over the cylinder wall. It is this radial expansion and contraction, or increase and decrease in the size of the ring during its operation, that is largely responsible for the failures of laminated rings as heretofore used.

Fig. 5 shows four laminations 3', 3', 3', 3' arranged in a pile so as to provide a single ring of ⅛" width. The rings are in nowise connected but are merely piled together with the gaps g' spaced the maximum distance apart. This spacing of the gaps g' is resorted to so that it will be impossible for them to come into registering relation and permit the escape of oil through the gap. Therefore, when the laminations are compressed the gaps g' will, of course, close causing movement of the ends e, e of each lamination in the direction of the arrows. Since the gaps g' of the laminations are in opposition the ends of adjacent laminations will have to travel in opposite directions in order that the ring as a whole may be contracted. The friction between the contacting surfaces of the laminations is considerable and will of course oppose the movement of the laminations necessary to permit such ring contraction. I have overcome this defect in laminated rings by arranging the gaps of the respective laminations in close proximity, as above described, and permanently fixing this relationship of the respective gaps by securing the laminations together by the pin 4 adjacent to said gaps. By fixing this arrangement of the gaps in the laminations all of said laminations will move in the same general direction when the ring as a whole is compressed, except for the short overlapping portions f, f, f (Fig. 4). It is thus apparent that I have reduced the frictional resistance to the expansion and contraction of the ring to a minimum, and while obtaining the advantages of the laminated construction I also retain the advantage of the one-piece ring so far as minimum resistance to the action of the ring is concerned.

In Figs. 7 and 8 I show a modification of the invention in which the intermediate laminations 6, 6 have plane surfaces or flat faces 7, 7 formed on the cylinder contacting edge of the lamination. In each lamination the flat faces 7 are spaced a somewhat greater distance than the length of the flat faces and the laminations 6, 6 are arranged in the pile that makes up the complete ring 1' so that the faces 7 of one lamination 6 are staggered with respect to the faces 7 of the next adjacent lamination 6. It is obvious that where the flat faces occur the ring will not contact with the cylinder wall, the result of which is to increase the unit pressure against the balance of the ring lamination. Another advantage of providing the flat faces 7 on the laminations is that it gives the ring as a whole greater adaptability to worn cylinders. This is true because there is less ring surface in contact with the cylinder wall, although on account of staggering the flat faces of adjacent laminations no part of the cylinder wall will be without contact with some part of the piston ring. The flat faces of the laminations also provide, in conjunction with the cylinder wall, oil pockets which retain a certain amount of oil during the operation of the piston and further the lubrication of the cylinder wall.

In Figs. 7 and 8 I also show a modified arrangement of the gaps 5', 5', 5', 5' of the laminations, maintaining said gaps however in close proximity to the pin 4' which holds the laminations in permanently assembled relation. Obviously, other arrangements of the gaps of the laminations may be resorted to without departing from the spirit of the invention.

I also wish to be understood that in the present invention I may combine bronze laminations and steel laminations. When I utilize both bronze and steel laminations the bronze laminations will preferably be placed on the inside of the pile and steel laminations on the outside to form the side faces of the ring as a whole.

It is to be understood that my improved piston ring may be used as illustrated and explained, or it may be used in conjunction with a spring inner ring. Inner rings, or piston ring expanders as they are also called, are well known in the art and consist of a ribbon of spring steel variously shaped, although the most common shape is polygonal. According to the practice the inner ring is inserted in the bottom of the ring groove behind the piston ring and augments the ring tension.

Having described my invention, I claim:

1. A laminated piston ring for engines comprising a plurality of similar metallic flat split superposed ring sections arranged with the gaps of adjacent sections in close proximity, said sections being connected at one point in the circumference of the ring, and adjacent sections having plane surfaces spaced around their peripheral faces, the plane surfaces of one section being staggered with respect to those of the next adjacent section.

2. A laminated piston ring for engines comprising a plurality of similar metallic flat split superposed ring sections arranged with the gaps of adjacent sections in non-registering relation, adjacent sections having plane surfaces spaced around their peripheral faces, the plane surfaces of one section being staggered with respect to the next adjacent section, and the sections being connected so as to maintain said staggered relation.

CHARLES A. MARIEN.